(12) United States Patent
Herzig

(10) Patent No.: US 8,544,932 B2
(45) Date of Patent: Oct. 1, 2013

(54) FUEL INLET TUBE FOR AUTOMOBILES

(75) Inventor: Jurgen Herzig, Buchbrunn (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 244 days.

(21) Appl. No.: 12/933,929

(22) PCT Filed: Apr. 7, 2009

(86) PCT No.: PCT/IB2009/051471
§ 371 (c)(1),
(2), (4) Date: Sep. 22, 2010

(87) PCT Pub. No.: WO2009/125351
PCT Pub. Date: Oct. 15, 2009

(65) Prior Publication Data
US 2011/0017732 A1    Jan. 27, 2011

(30) Foreign Application Priority Data
Apr. 8, 2008    (DE) .......................... 10 2008 017 687

(51) Int. Cl.
*B60K 15/05*    (2006.01)
(52) U.S. Cl.
USPC ...................................... 296/97.22; 220/86.2
(58) Field of Classification Search
USPC ............... 296/1.06, 97.22, 208, 146.5, 146.6, 296/146.7, 146.9, 93; 220/86.2
IPC ....................................................... B60K 15/05
See application file for complete search history.

(56) References Cited

U.S. PATENT DOCUMENTS

| | | | | |
|---|---|---|---|---|
| 4,142,756 | A * | 3/1979 | Henning et al. | 296/97.22 |
| 6,033,006 | A * | 3/2000 | Bovellan et al. | 296/97.22 |
| 6,435,233 | B1 * | 8/2002 | Miura et al. | 141/390 |
| 6,478,360 | B1 * | 11/2002 | Reutter | 296/97.22 |
| 7,318,462 | B2 * | 1/2008 | Ganachaud | 141/350 |
| 7,390,048 | B2 * | 6/2008 | Yoshimura | 296/97.22 |
| 7,647,955 | B2 | 1/2010 | Murabayashi | |

FOREIGN PATENT DOCUMENTS

| | | |
|---|---|---|
| EP | 0736406 A1 | 10/1996 |
| EP | 0990548 A2 | 4/2000 |
| EP | 1657097 A1 | 5/2006 |
| EP | 1829727 A1 | 5/2007 |
| FR | 2637351 A1 | 4/1990 |

OTHER PUBLICATIONS

ISR for PCT/IB2009/051471 mailed Jul. 29, 2009.

* cited by examiner

*Primary Examiner* — Glenn Dayoan
*Assistant Examiner* — Pinel Romain
(74) *Attorney, Agent, or Firm* — Lowe Hauptman & Ham, LLP

(57) ABSTRACT

An automobile fuel-tank tube comprising a tube body made of a first plastic and fitted at one end with means for its affixation to an automobile body opening, further comprising a base integrally shaped with said tube body and made of a second plastic softer than the first and including an aperture to receive in sealing manner a comparatively hard filling pipe, a reinforcing section being integrated into the base and also consists of the first plastic and counteracts radial and/or circumferential deformation of said base.

8 Claims, 2 Drawing Sheets

FUEL INLET TUBE FOR AUTOMOBILES

RELATED APPLICATIONS

Figure 1:
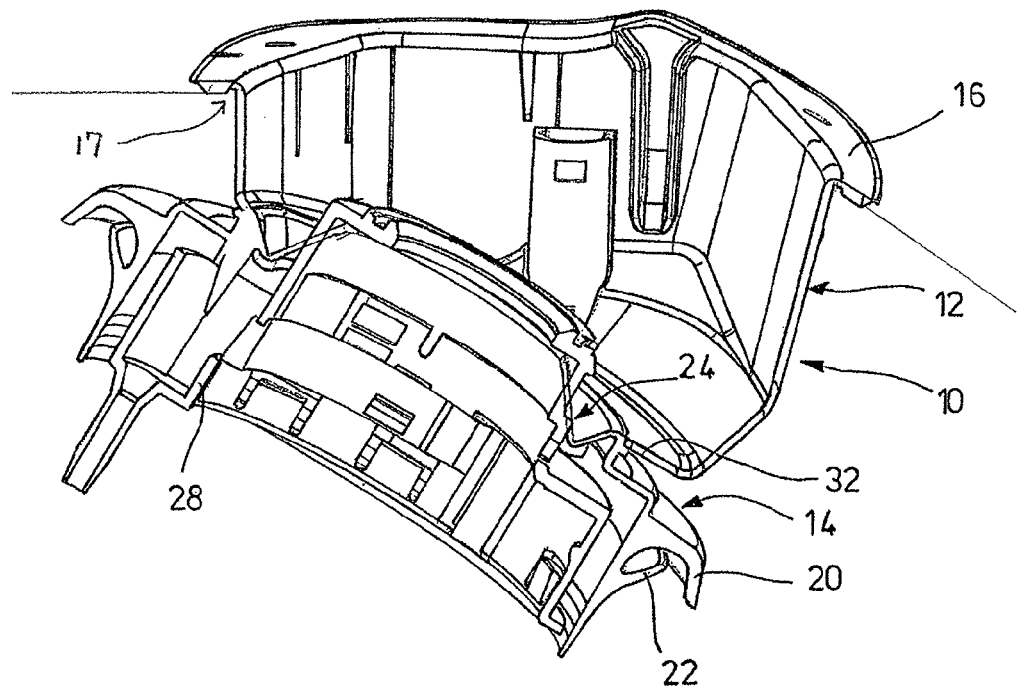

The present application is national phase of International Application Number PCT/IB2009/051471 filed Apr. 7, 2009, and claims priority from, German Application Number 10 2008 017 687.7 filed Apr. 8, 2008.

The present invention relates to an automobile fuel-tank tube defined in claim 1.

As regards fuel-tank tubes of the state of the art, the tube body is held by clips in a body opening. The tube base is fitted with an aperture passing a filling pipe connected to said tank. Suitable sealing must be provided between said filling pipe and said base. It is already known from the European patent document EP 0 736 406 B1 to integrally manufacture the base by two-component injection molding with the remaining part of the tube, though using a softer, elastomeric material. The tube body per se inherently requires a comparatively hard plastic to offer adequate mechanical strength and effective anchoring in the automobile body's opening.

Manufacture and installation entail substantial tolerances on one hand regarding the position of the filling pipe and on the other hand the aperture in the tube base. Undesirable deformation of the bottom in its aperture zone may arise during assembly, as a result of which the tube base edge—which does form the seal in the state of the art—no longer rest uniformly around the outer surface of said filling pipe and does cause seal failure.

The objective of the present invention is to create an automobile fuel-tank tube attaining effective sealing between said filling pipe and the tube even in the presence of large tolerances.

This objective is attained by the features of claim 1.

The fuel-tank tube of the present invention comprises an integral reinforcement section of the tube base, said section being made of the same plastic as the tube. The purpose of the reinforcing zone is to mechanically oppose radially or peripherally deforming the base segment. In the present invention, an unanticipated, undesired change in position of the filling pipe relative to the tube, respectively an assembly position relative to said tube deviating from the nominal position, shall not entail detaching the seal off the filling pipe. Instead said reinforcing section assures effectively maintains a sealing position at the filling pipe.

The present invention allows a number of designs, in apposing the reinforcement section. One such design is defined in an embodiment mode of the present invention in that the said base be in the form of a bellows and in that the reinforcing section be shaped onto a bellow's outside fold face. Illustratively the base may be cross-sectionally V-shaped, the apex of the V pointing away from the open tube end. The reinforcing section is integral with the apex' outside face. In especially advantageous manner the reinforcing section may rest from the outside against the filling pipe. The reinforcing section evenly transmits the tensile and compressive forces into the base structure between the reinforcing section and the tube. As a result the sealing clip resting against the filling pipe between the said reinforcement and said pipe thereby remains prestressed and cannot detach.

In another embodiment of the present invention, the reinforcing section is the rim segment of an annular edge zone of said base, said rim segment cooperating in sealing manner with the outside of the filling pipe.

In still another embodiment mode of the invention, the above rim segment is cross-sectionally angular, preferably right-angular, one leg being integral with the base and the other leg cooperating by means of a groove-spring link with the filling pipe. The integrated annular reinforcement section may be connected directly to the filling pipe, for instance by using clips, by slipping the components one over the other and in similar ways. Because the filling pipe is connected directly, excessive radial tolerances no longer can entail filling-pipe detachment. This last embodiment mode of the invention is especially appropriate for so-called capless tank tubes.

The present invention is elucidated below by two illustrative embodiments shown in the appended drawings.

Figure 2:
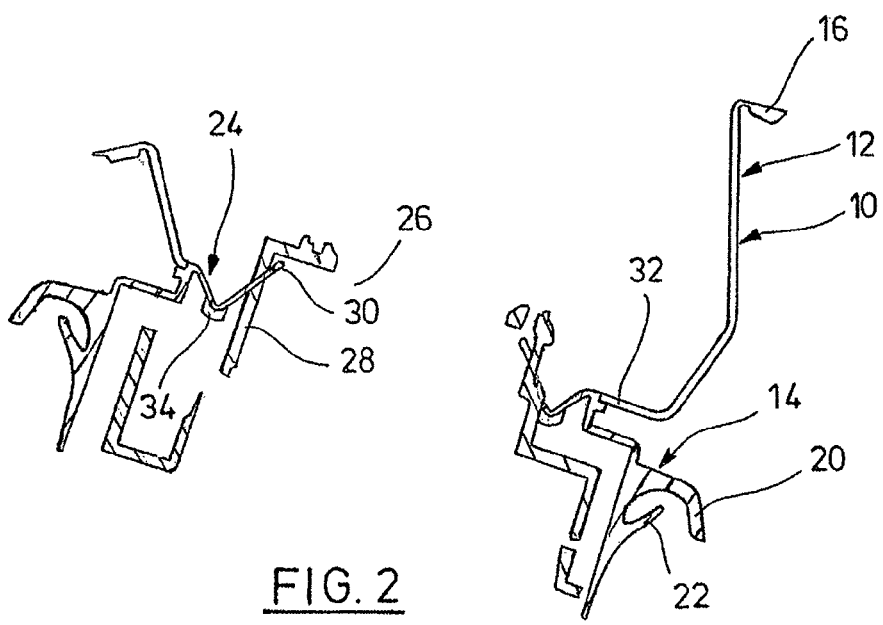
Figure 3:
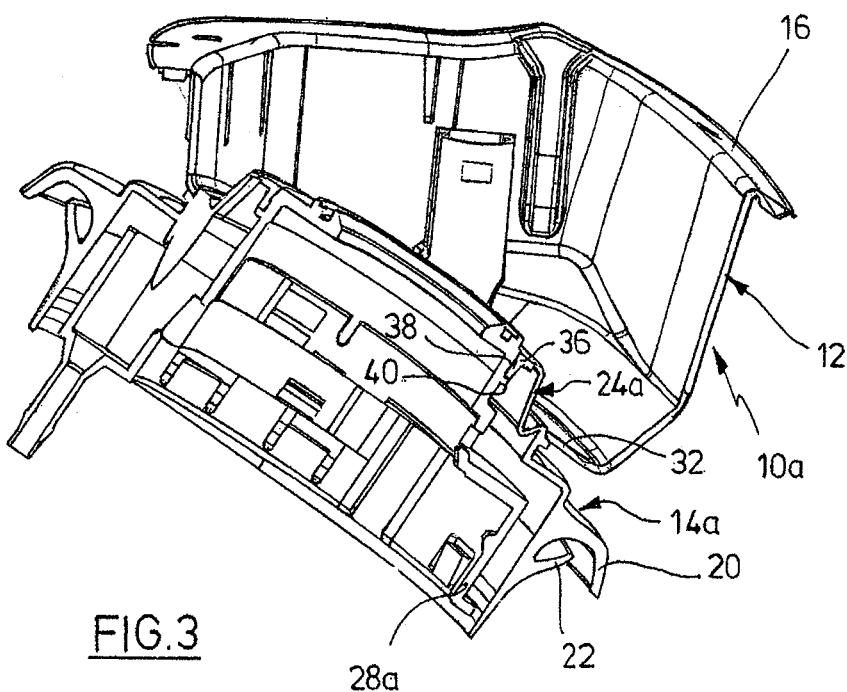
Figure 4:
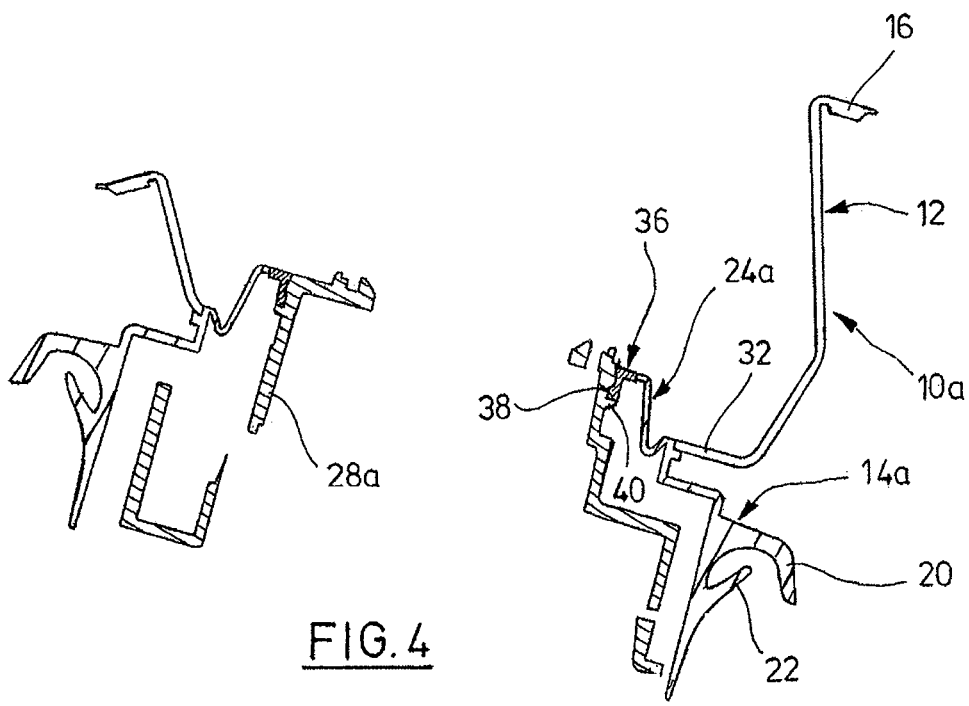

FIG. 1 is a perspective section of a first embodiment mode of fuel tank tube of the invention, FIG. 2 is a section similar to that of FIG. 1, only the components situated in the sectional plane being shown, FIG. 3 is a section of a perspective of a fuel tank tube of the invention of another embodiment mode, and FIG. 4 is a section similar to that of FIG. 3, however showing only the components in this sectional plane.

The fuel-tank tube shown in FIGS. 1 and 2 is denoted overall by 10 and consists of a tube body 12 and a tube base 14. The tube body 12 is fitted at its outside with a flange 16 which is connected to the outer skin of the body of an automobile and within an aperture 17. The tube base 14 is integrally made with the tube body 12 by injection molding, where the tube body 12 is a comparatively hard plastic but the tube base 14 is made of a softer plastic, in particular an elastomer. The manufacture is carried out by a so-called two-component injection molding procedure. Said tube base is fitted with two lips 20, 22 cooperating with a hole rim of an omitted automobile inner skin to implement affixation to this inner skin.

The tube base 14 furthermore comprises an annular, cross-sectionally V-shaped sealing element 24. The inner leg of the V-shaped sealing element 14 constitutes an aperture 26 receiving a filling pipe 28 also made of a harder material. FIGS. 1 and 2 show the sealing element 24 in its relaxed state. When the filling pipe 28 is inserted, the slightly thicker edge 30 of the sealing element 24 comes to rest against the outside of the filling pipe 28 and thereby seals said pipe relative to the tube body 12. As further shown by FIGS. 1 and 2, the other leg of the V-shaped sealing element 24 joins a base zone 32 of the tube body 12.

A reinforcing ring 34 is integrated into the outside of the apex of the sealing element 24. Said ring is made of the same plastic as the tube body 12. As shown on the right side of FIG. 2, the ring 34 may rest against the outside of the filling pipe 28. As a result it transmits evenly the tensile and compressive forces into the sealing geometry of the sealing element 24. Consequently the sealing leg resting against the filling pipe 28 always retains its prestressed state and cannot detach from the pipe.

Further details relating to the fuel-tank tube of FIG. 1 are not discussed herein either being already known or of no significance to the interaction between the filling pipe 28 and the tube 10.

The same reference numerals shall be used where the same components are used in the embodiment mode of FIGS. 3 and 4 as in that of FIGS. 1 and 2. The feature of the embodiment mode in the embodiment of FIGS. 3 and 4 is a cross-sectionally right-angle reinforcing ring 36 integrated into the cross-sectionally V-shaped sealing element 24a. Said ring is made of the same material as the tube body 12. One of the legs of the reinforcing ring 36 abuts the sealing element 24. The other leg of the reinforcing ring 36 is fitted at its outside with a groove mechanically interlocking with a spring at the outside of the filling pipe 28 as indicated at 38. The ring 36 is clipped onto the filling pipe 28 until the said groove and spring are cooperating. The filling pipe 28a is fitted at its outside with a flange-like radial collar 40 limiting the displacement of the reinforcing ring 36 away from the aperture of the filling pipe 28a.

The illustrative embodiment mode of FIGS. 3 and 4 is especially well suitable for so-called capless filling systems. Because of the direct connection of the filling pipe 28a and the fuel-tank tube, even large tolerances between 28a and the tube 10a are unable to cause sealing failure.

The invention claimed is:

1. An automobile fuel-tank tube, comprising:
a tube body which is made of a first plastic and which is fitted at one end with fasteners to affix said tube body within an automobile body aperture,
a base integrally shaped with said tube body and made of a second plastic softer than the first and fitted with an opening receiving in sealing manner a relatively hard filling pipe;
wherein a reinforcing ring is integral with said base and also is made of said first plastic and does counteract radial and/or circumferential deformation of said base,
wherein the base further comprises a sealing element having a cross-sectional V-shape in the form of a bellows, and
wherein said reinforcing ring is mounted on the outside of said bellows.

2. The automobile fuel-tank tube as claimed in claim 1, wherein the said bellows comprises an apex pointing away from one end and in that the reinforcing section is integral with an outer face of said apex.

3. The automobile fuel-tank tube as claimed in claim 1, wherein the reinforcing section is annular.

4. The automobile fuel-tank tube as claimed in claim 1, wherein the reinforcing section rests externally against the filling pipe.

5. The automobile fuel-tank tube as claimed in claim 1, wherein an aperture rim of the base is thickened.

6. The automobile fuel-tank tube as claimed in claim 1, wherein the reinforcing section is an annular rim segment of the base aperture which cooperates in sealing, mechanically interlocking manner with the outside of the filling pipe.

7. The automobile fuel-tank tube as claimed in claim 6, wherein the reinforcing section is cross-sectionally angular, one of its legs being integral with the base and the other leg cooperating by means of a groove-spring link with the filling pipe.

8. The automobile fuel-tank tube as claimed on claim 7, wherein a flange is integrated into the outside of the filling pipe and limits a displacement of the second leg of the annular section away from the other end of said tube body.

\* \* \* \* \*